Feb. 16, 1943.  C. M. TUTTLE ET AL  2,311,101
DENSITOMETER
Filed March 6, 1941

CLIFTON M. TUTTLE
WILLIAM BORNEMANN
INVENTORS

BY *Newton M. Perrins*

ATTORNEY

Patented Feb. 16, 1943

2,311,101

UNITED STATES PATENT OFFICE 2,311,101

DENSITOMETER

Clifton M. Tuttle and William Bornemann, Rochester, N. Y., assignors to Eastman Kodak Company, Rochester, N. Y., a corporation of New Jersey Application March 6, 1941, Serial No. 382,004

10 Claims. (Cl. 88—14)

This invention relates to densitometers and particularly to reflection densitometers.

It is an object of the invention to provide means for measuring the diffuse reflectivity or diffuse reflection density of a surface such as a paper surface.

It is a particular object of the invention to provide such a device which is convenient to use, simple in its construction, accurate in its results and which is free of any effects caused by specular reflection by the test surface.

It is an object of one embodiment of the invention to provide means for confining the measurement to angles of reflection less than a certain maximum. Alternatively, it is an object of one embodiment of the invention to measure substantially all of the diffuse reflection, i. e. all reflections at angles differing from pure specular reflection by at least 10 degrees.

It is an object of the preferred embodiment of the invention to provide a convenient manner of selecting the area of the test surface which is to be measured. Since it is usually desirable to measure the reflectivity, in this case the diffuse reflectivity, of a very small area of a photographic print, the feature of the invention providing this latter object is necessary when accurate selection of such a small area is desired.

According to the invention, there is provided a densitometer employing a photoelectric cell for measuring the light reflected at a certain large angle (e. g. greater than 10°) from a diffusing surface illuminated at substantially normal incidence only. The illuminating beam which may be in the form of a converging cone strikes the surface to be measured normally. This beam is focused but not necessarily exactly on the test surface; it must be sufficiently focused that the optical system will be reasonably efficient. A photoelectric cell facing the test surface and to one side of, or preferably surrounding, the illuminating beam receives the light reflected at angles at least greater than one-half the angle of the incident cone. Thus in the preferred embodiment of the invention, the photoelectric cell has a hole through which the illuminating beam passes.

The maximum angle of reflection which affects this photoelectric cell depends on the size of the cell and the distance thereof from the test surface. In one embodiment of the invention for measuring only relatively small angles, (e. g. up to say 45°) this maximum angle is defined and controlled by an adjustable diaphragm between the test surface and the photoelectric cell. Alternatively if all or practically all of the diffuse light is to be included in the measurement, the mask which defines the section of the test surface being measured is provided with a tapered tunnel whose walls are highly reflective and whose small end comes in contact with the test surface. In this latter embodiment, practically all the light reflected at angles greater than 10° or 20° say, strikes the photoelectric cell directly or by reflection from the highly polished tunnel walls.

For convenience this densitometer is provided with a housing containing the light source and the photoelectric cell and having one end wall of this housing to act as the mask with an aperture defining the area of the test surface, which area is to be measured. The meter for measuring the output of the photoelectric cell, either with or without a suitable amplifier, may be mounted on the housing or if the present invention is to be used as an accessory to a transmission densitometer, the output of the cell may be conducted to the meter of the transmission densitometer by suitable electrical leads. When large sheets or large photographic prints are to be tested, the whole unit is portable so that it may be placed anywhere on the test surface. On the other hand, if only small or standard-size prints are to be measured, the unit in its housing may be hinged to the table on which the print is laid for measurement.

In either case, it is convenient to have the end wall which acts as the mask for the test surface, hinged onto the rest of the housing so that the test surface can be viewed through the small aperture in this mask. This permits accurate selection of the minute area which is to be measured. After the mask has been accurately aligned on and in contact with the test surface, the rest of the meter is swung closed onto the mask and a reading taken. In general the mask must be sufficiently free from the housing to permit accurate positioning relative to the test surface and then there must be some means (the hinge in the present example) for aligning the illuminating beam and the aperture in the mask.

Such an instrument does not measure any of the specular reflection and is not affected by this specular reflection, since the specularly reflected light travels back along the incident beam without striking the photoelectric cell.

Other objects and advantages of the invention will be apparent from the following description when read in connection with the accompanying drawing in which.

Figure 1:
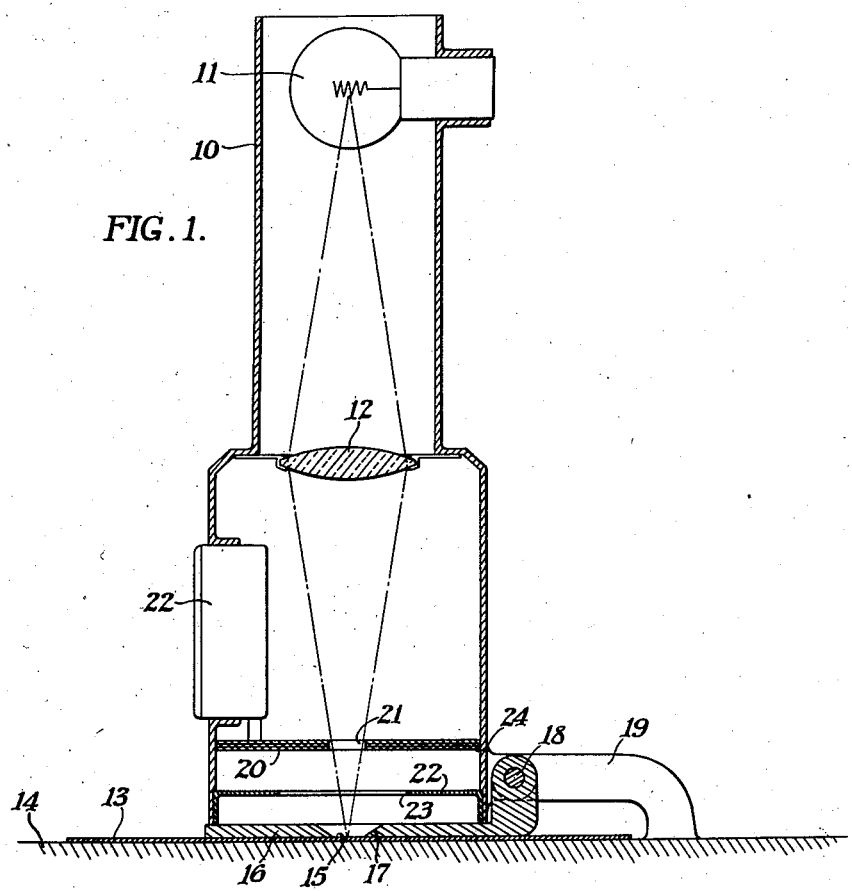
Fig. 1 shows a vertical cross section of one embodiment of the invention.
Figure 2:
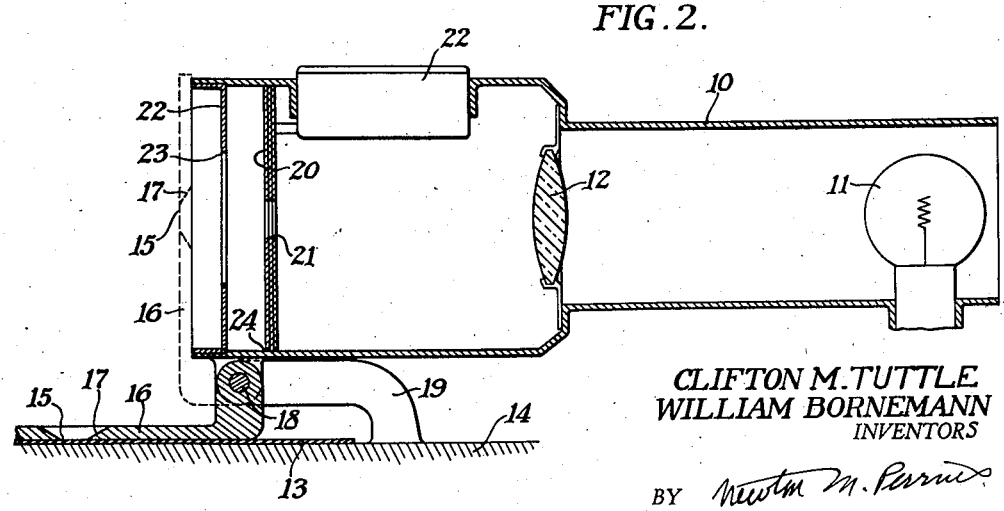
Fig. 2 shows the same embodiment of the invention with the test surface mask in the position it occupies when the area to be measured is being selected.

In Fig. 1 a housing 10 provided with means for illuminating the test surface 13, which illuminating means consists of a lamp 11 and a lens 12 is shown in the position it occupies during the taking of a reading. The photographic print or paper surface 13 which is to be measured is placed on a table 14 and as best shown in Fig. 2, a mask 16 is placed in contact with this test surface 13. An aperture 15 in this mask defines the exact area to be tested. In the embodiment shown, the paper 13 is moved under the mask 16 until the area to be tested comes in alignment with this aperture 15. This aperture 15 is preferably the small end of a tapered tunnel having conical walls 17.

In an embodiment of the invention wherein substantially all of the diffuse light is to be measured, the walls 17 are highly polished. If it is desirable to measure only diffuse light reflected at angles smaller than some maximum angle, these walls 17 are painted a dull black.

This mask 16, is in the embodiment shown, hinged to the housing 10 by a hinge 18. The whole unit is also hinged at this hinge 18 to an arm 19 mounted on the table 14. Since this arm 19 limits the area of the print 13 which may be conveniently placed under the aperture 15, an embodiment of the invention for measuring large prints, omits this arm 19 entirely. However, either embodiment of the invention preferably has the end wall 16 hinged for convenience in accurate selection of the small area to be measured.

The light coming from the source 11 and focused by the lens 12 on the aperture 15 strikes the test surface substantially at normal incidence and is diffusely reflected back to a photoelectric cell 20 to one side of the illuminating beam and preferably surrounding the beam, in which case the beam passes through a hole 21 in this photoelectric surface 20. The output of the photoelectric surface is measured by a suitable meter 22 which may be mounted in the housing 10 or may be separate therefrom, particularly when the instrument is used as an accessory to a transmission densitometer having its own meter. All of the light specularly reflected from the surface 13 passes back through the hole 21 and does not affect the photoelectric cell 20. When the tunnel walls 17 are highly polished all diffuse light reflected at angles greater than half the angle of the incident cone (with the exception of the small amount reflected from walls 17 which gets back through the hole 21) strikes the photoelectric cell and is measured.

When the walls 17 are a dull black or of very low reflectivity, the maximum angle of diffusion which is measured is defined by the edges 24 of the photoelectric cell 20. On the other hand, it may be desirable to further limit this angle and to have this angle adjustable. In this case an adjustable diaphragm 22 is provided having an aperture 23 which limits and controls the maximum angle of reflectivity which strikes the photoelectric cell. For most practical purposes the maximum angle of diffuse reflection is not of great importance and in this case the diaphragm 22 is omitted. If the photoelectric cell is of low sensitivity it is desirable to collect the diffusely reflected light efficiently on to the cell, in which case the walls 17 are made highly reflective as described above.

In making a measurement, the operator first sets the device over a piece of white paper base (similar to that on which the photographic print is made) and adjusts the light intensity by means of a rheostat (not shown) until the microammeter reads zero. Such a rheostat is usually included in transmission densitometers and the same one would be employed when this device is used as an accessory to such a transmission densitometer. With the instrument tipped back he then locates the aperture 15 of the base plate 16 over the area which he desires to measure, tips the instrument to the measuring position and reads the microammeter. That is, when the instrument is used in this way, the white base is taken to have a zero reflection density, and the instrument measures a diffuse reflection density relative to this standard zero.

In order to produce numerical results equivalent to those of standard visual reflectance densitometry we, in one modification of the instrument, prefer to limit both the maximum and minimum angles of the light collected by the photocell. This aim we accomplish in a convenient manner by application of an opaque paint to the cell surface so as to leave only an annular ring of active surface whose smaller radius subtends an angle of 45 degrees at the sample area while the greater radius subtends an angle of 50 or 60 degrees.

The advantage of painting the cell surface rather than cutting it away lies in the fact that with only a small hole, the cell cuts off stray light and may even be the effective aperture of the illuminating system. Only light reflected at angles greater than those which strike the opaque surface is measured.

Having thus described some of the preferred embodiments of our invention, we wish to point out that it is not limited to these structures but is of the scope of the appended claims.

What we claim and desire to secure by Letters Patent of the United States is:

1. A densitometer for measuring the diffuse reflection density of a surface, comprising a housing with an opening in one end against which the surface may be held, means in the housing for focusing a cone of light at substantially normal incidence onto the opening with the apex of the cone substantially at the surface, a photoelectric surface carried in the housing and surrounding the light cone at a point spaced from its apex for receiving light diffusely reflected by the surface at angles greater than that of one-half of said cone and means for measuring the response of the photoelectric surface.

2. A densitometer according to claim 1 having a diaphragm between the surface and the cell for limiting the light reaching the cell to less than a certain maximum angle of reflection.

3. A densitometer for measuring the diffuse reflection density of a surface, comprising a housing with an aperture in one end wall thereof against which wall the surface is to be placed for measurement, said end wall being at least partially removable from the rest of the housing for separate positioning relative to the surface so that the surface may be viewed through the aperture during said positioning, means in the housing for focusing a beam of light, means for aligning said rest of the housing and the end wall with the light beam focused on said aperture, substantially at normal incidence with respect to said end wall, a photoelectric surface carried in the housing, facing said end wall and aperture when so aligned and surrounding the light beam for receiving light only diffusely reflected by the surface when at the aperture and means for measuring the response of the photoelectric cell.

4. A densitometer according to claim 3 having said end wall hingedly attached to the housing, with the hinge constituting said aligning means.

5. A densitometer according to claim 3 having a table for supporting in a certain plane the surface to be measured, and a hinge on the table for rotatably supporting the housing with said end wall thereof positionable into said certain plane.

6. A densitometer according to claim 3 having a diaphragm between the aperture and the cell for limiting the light reaching the cell to less than a certain maximum angle of reflection.

7. A densitometer according to claim 3 in which said end wall has a tapered tunnel therethrough, the smaller end of the tunnel being on the outside of the wall and forming said aperture and the walls of the tunnel being highly reflective.

8. A densitometer for measuring the diffuse reflection density of a surface, comprising a housing with an aperture in one end wall thereof against which wall the surface is to be placed for measurement, means in the housing for focusing a narrow cone of light on said aperture, substantially at normal incidence with respect to said end wall, a photoelectric surface carried in the housing facing said aperture and surrounding said cone of light for receiving light diffusely reflected by the surface at angles greater than that of one-half of said cone and means for measuring the response of the photoelectric surface.

9. A densitometer according to claim 8 in which the part of the photoelectric surface immediately adjacent to the incident cone of light masks off light other than that in said cone and is opaquely coated out to a predetermined distance from the cone whereby only light diffusely reflected at angles greater than those which strike the opaque coating is measured.

10. A densitometer according to claim 1 having that portion of the surface of the photoelectric cell which is immediately adjacent to the cone of light, opaquely coated out to a predetermined distance from the beam for limiting the light reaching the cell to more than a certain minimum angle of reflection.

CLIFTON M. TUTTLE.
WILLIAM BORNEMANN.